(United States Patent Office)

3,218,174
PROCESS FOR PREPARING A HEAT RESISTANT
CHOCOLATE PRODUCT
Gian-Franco Schubiger and Walter Rostagno, La Tour-de-Peilz, Switzerland, assignors to Afico S.A., Lausanne, Switzerland, a corporation of Switzerland
No Drawing. Filed Nov. 21, 1962, Ser. No. 239,328
Claims priority, application Switzerland, Nov. 29, 1961, 13,874/61
3 Claims. (Cl. 99—23)

Chocolate products are thorough mixtures of liquid cocoa, cocoa butter, sugar, and possible milk and flavouring substances. They therefore contain fatty substances which soften and melt between 30 and 35° C.

When articles which consist entirely or partly of these products are exposed to temperatures lying above the melting point of the aforesaid fatty substances, (i.e. temperatures occurring during the summer season or in tropical countries), they tend to lose their original shape and appearance, become soft and upleasant to handle. If they are wrapped, the entire surface of the article adheres to the wrapper.

In the case of chocolate coatings intended to enrobe articles such as biscuits, confectionery, etc., the content in fatty substances is greater than in chocolate tablets, for instance. This is the reason why these articles immediately lose their original appearance and are no longer suitable for consumption when they have been exposed to high temperatures.

Different processes have been proposed in order to avoid the said disadvantages, but the products obtained, although more resistant to the effects of high temperature, have an unpleasant taste and a perceptibly coarser texture than that of normal conched chocolate. Furthermore, these processes are applicable only to chocolates containing milk.

The object of the present invention is a heat-resistant chocolate article which does not adhere to the wrapper at temperatures exceeding 30° C. and which is characterized by the fact that it comprises a sugar skeleton, and that the character of heat-resistance extends homogeneously throughout the entire section of the article. Moreover, the invention also concerns a process for manufacturing such a chocolate article, with or without milk, having the characteristic flavour of a conched chocolate, and which retains its original appearance under the temperature conditions prevailing in summer or in tropical countries. This process is especially remarkable in that a first mass of sweetened, non conched chocolate of which at least the greater part of the sugar is in amorphous form, is thoroughly mixed with a second mass of conched chocolate containing sugar in crystallized form, and in that the product is submitted after moulding and packing in a hermetic wrapper, to a heat treatment which consists in keeping the chocolate at a constant temperature lying between 20 and 35° C. for a period varying from ten to sixty days.

In chocolate obtained in the usual manner, the cocoa butter crystallizes and, if milk chocolate is concerned, sometimes also the fatty substances present in the milk. When such chocolate is exposed to a temperature exceeding the melting point of the cocoa butter, the latter melts and causes the fluidification of the mass. The process according to the invention makes its possible to obtain a chocolate of which the structure is dependent of non-fat solids contained in the mass and, consequently, less sensitive to heat. Sugars in amorphous form are particularly suitable for building up such a structure, the particles of these sugars having the property of adhering to each other when they are submitted to a heat treatment and, consequently, of forming within the chocolate mass an edifice or skeleton which is more resistant to the collapse of the chocolate mass when the temperature exceeds the melting point of the said fatty substances.

The process consists in preparing a mass of chocolate in which all the sugar is in amorphous state. This mass is worked in the usual way, except that the operations are carried out at low temperature in order to avoid the agglomeration of the sugar particles, and that all conching operations are eliminated in order to allow fat-free sugar particles to subsist.

In consideration of the difficulties concerning the production of a pure amorphous sucrose which, moreover, is very unstable and easily crystallizes, it is advantageous to incorporate reducing sugars such as invert sugar or dextrose which prevent the amorphous sucrose from "graining." Three methods can be used for the preparation of an amorphous sugar utilizable for the execution of the process according to the invention:

(1) Spray-drying of a sweetened milk syrup or of a mixture of sweetened milk and liquid cocoa;
(2) Drying under vacuum of a highly concentrated sweetened milk syrup or of a mixture of sweetened milk and liquid cocoa;
(3) Boiling under vacuum of a sugar syrup;

the first two methods applying naturally to the manufacture of milk chocolate.

Whatever the method adopted, the best results are obtained by the use of a mixture of sugars containing invert sugar or dextrose in a sucrose/reducing sugar ratio, based on the dry matter, lying respectively between 70:30 and 90:10. A ratio chosen between these limits will give entire satisfaction, but it is understood that other proportions can produce good results.

The amorphous sugar may also be constituted by a mixture of the butterscotch type, comprising sucrose, at least one reducing sugar and a fat, the latter representing, in weight, a value lying between 5 and 10% of the total weight of the sugars.

In order to obtain a chocolate having the characteristic flavour and structure of a good chocolate, the aforesaid mass is mixed, in fairly equal proportions, with a second conched mass obtained in the usual way and in which all the sugar is present in crystallized form. The quantity of this latter mass as compared to the whole is inversely proportional to the heat resistance obtained. In this way, it is therefore easy to vary the degree of heat resistance of the chocolate at a determined temperature.

In order to avoid a hardening of the mass, the temperature of the mixture must not exceed 35–40° C. during manufacture. The fat content is adjusted so as to obtain the desired viscosity; cocoa butter or a mixture of fats is added up to a total fat content of about 36%. When the fat content exceeds this percentage, most of the sugar particles are surrounded by a fatty film and, consequently, cannot adhere to each other to form the above described edifice when the chocolate undergoes the effect of heat. If the final viscosity of the mass is too high, it can be adjusted by an addition of as much as 0.2% lecithin.

In the following example, which illustrates a precise form of execution of the invention, the proportions are expressed in ponderal ratios.

*Example*

A concentrated sugar syrup is prepared, on the basis of the dry matter, with 82% sucrose and 18% of reducing sugars such as those present, for instance, in a syrup of invert sugar or in commercial dextrose monohydrate. This syrup is boiled under vacuum until the moisture content is about 1–2%, and spread on water-cooled trays in order to bring the temperature down to about 80° C. The sugar is then divided into portions having not more than 5 mm. thickness by means of a mechanical installation, for example; it can be used immediately or stored in moisture-proof containers.

According to another embodiment of the process, the amorphous sugar could be constituted by a composition of the butterscotch type which comprises, in addition to the above-mentioned sugars, fresh butter or another fat such as butter oil, cocoa butter, etc. representing, in weight, a value lying between 5 and 10% of the total weight of the sugars. The fat is added to the sugars after the latter have been brought to a temperature lying between 140 and 165° C. The mixture is then cooled and the subsequent operations are carried out as described above.

In a dry mixer, 45 parts of the boiled sugar obtained are mixed with 11.2 parts of deodorized cocoa butter, in order to reduce the size of the sugar particles. 21 parts of milk powder and 13 parts of liquid cocoa are then added and the whole mass is mixed for about 10 minutes. The mixture is then ground by means of a refiner with water-cooled cylinders and 86 parts of the refined mass are placed, with 4.6 parts of deodorized cocoa butter, in a mixer heated to a temperature not exceeding 40° C. When the mass is thoroughly homogeneous, 90.8 parts of a conched "standard" mass are added to the first mass in the same mixer. This "standard" mass is prepared in the usual way and contains the same ingredients as the special mass with the exception of the boiled sugar, which is entirely replaced by crystallized sucrose. The temperature is maintained below 40° C. A small addition (0.5%) of glycerin monostearate, which makes it possible to avoid "bloom" on the chocolate, can be made at this stage of the process if it is intended to store the product under tropical conditions. Aromatic substances, such as vanillin, etc., can also be added to the mixture in the desired proportions.

In order to make possible the moulding and packing operations, the chocolate is tempered at a temperature of about 30° C., then cooled to a temperature lying between 15 and 5° C.

Finally, the last operation of the process, which completes the development of the heat resistance, consists in storing the chocolate, in hermetically sealed wrappers, in a dry room where the temperature is kept constant at 25° C., for 20 to 30 days.

The distinctive nature of heat-resistant chocolate manufactured according to the invention can be detected by resorting to a simple means of control which consists in immersing, for several hours, a piece of chocolate in ether.

If the chocolate has been manufactured by the usual process, i.e. if its structure is based on the solidification of the fatty substances, the chocolate lying on the bottom of the container will collapse completely as a result of the extraction of the aforementioned fatty substances by the solvent. On the contrary, a piece of heat-resistant chocolate, such as described above of which the structure is based homogeneously on an edifice of sugar particles, remains practically intact after prolonged immersion in ether. Finally, when the piece of chocolate is only superficially heat-resistant or, in other words, that it comprises a heat-resistant outer layer surrounding a more or less large nucleus which is not heat-resistant, it is observed that when a fragment of such chocolate is immersed in ether, only the outer layer is not destroyed by the action of the solvent.

It is understood that the invention is not limited to the conditions described above. For instance, the finished product may be a "plain" chocolate, a milk chocolate or a chocolate containing nuts. It may also contain fruit. The milk chocolate can be manufactured with full cream milk powder, skimmed milk powder, condensed milk, "crumb", etc. Whether the chocolate is "plain" or contains milk, nuts, etc. it can be used for coatings, solid chocolate articles without additions, bars, and similar products.

We claim:

1. A process for manufacturing a heat resistant chocolate product which does not adhere to a wrapper at temperatures exceeding 30° C. and having the qualities of a conched chocolate comprising forming a mixture by mixing in approximately equal proportions a first mass consisting essentially of a fat and a sweetened non-conched chocolate containing sugar, in excess of 50% by weight of the sugar being in amorphous form, said amorphous sugar containing a reducing sugar in amount sufficient to stabilize said amorphous sugar, with a second mass of conched chocolate containing sugar, all of said sugar contained within said second mass being in crystallized form, molding said mixture to form a shaped product, wrapping said shaped product and heat treating said wrapped product by subjecting said product to a temperature of from about 20° C. to about 35° C. for a period of from about 10 to 60 days, while said product is wrapped.

2. A process as claimed in claim 1, in which said first mass contains from about 10% by weight to about 30% by weight, based on the weight of said amorphous sugar, of a reducing sugar.

3. A process for manufacturing a heat resistant chocolate product according to claim 1 in which all steps of the process are carried out at a temperature not exceeding about 40° C.

References Cited by the Examiner

UNITED STATES PATENTS

| | | | |
|---|---|---|---|
| 1,364,192 | 1/1921 | Friedman | 99—23 |
| 2,480,935 | 9/1949 | Kempf et al. | 99—23 |
| 2,487,931 | 11/1949 | Lataner | 99—23 |
| 2,863,772 | 12/1958 | Kempf | 99—23 |
| 3,098,746 | 7/1963 | Noznick et al. | 99—23 |

OTHER REFERENCES

Williams: "Chocolate and Confectionery," 1956, Leonard Hill Books Limited: London, pg. 131.

A. LOUIS MONACELL, *Primary Examiner.*

BEATRICE H. STRIZAK, *Examiner.*